United States Patent [19]

Kuwata et al.

[11] Patent Number: 5,021,089

[45] Date of Patent: Jun. 4, 1991

[54] COMPOSITION FOR PROTECTING NONPOROUS SURFACES FROM WATER

[75] Inventors: Satoshi Kuwata; Takashi Ohkawara, both of Gunma, Japan

[73] Assignee: Shin-Etsu Chemical Co., Ltd., Tokyo, Japan

[21] Appl. No.: 486,641

[22] Filed: Feb. 28, 1990

[30] Foreign Application Priority Data

Feb. 28, 1989 [JP] Japan .................. 1-48374

[51] Int. Cl.$^5$ ............................... C09K 3/18
[52] U.S. Cl. ...................... 106/2; 523/169; 427/387; 106/18.12; 106/287.1; 106/490; 528/18; 528/37; 524/731; 524/755; 524/765; 524/770; 524/771; 524/792
[58] Field of Search ............ 106/2, 18.12, 287.1, 106/490; 528/187, 37; 556/405; 523/169; 524/731; 427/387

[56] References Cited

U.S. PATENT DOCUMENTS 3,579,540 5/1971 Ohlhausen ........................ 523/169
3,998,643 12/1976 Liddle ................................. 106/2
4,125,551 11/1978 Petersen ........................... 556/405
4,177,200 12/1979 Razzano et al. ................... 528/37
4,261,758 4/1981 Wright et al. ................ 106/287.12
4,719,276 1/1988 Stebleton .......................... 528/37
4,727,127 2/1988 Suziki .............................. 528/18
4,766,191 8/1988 Gvozdic et al. .................... 528/37
4,897,459 1/1990 Evans .............................. 528/18

Primary Examiner—William R. Dixon, Jr.
Assistant Examiner—Scott L. Hertzog
Attorney, Agent, or Firm—Millen, White & Zelano

[57] ABSTRACT

A water repellency treatment agent which is non-corrosive to metals, comprising a solution as a volatile solvent of 1-20 wt % of silyl phosphate containing 1-10 wt % of phosphorus, and less than 20 wt % of an organopolysiloxane of general formula $R_aSiO_{(4-a)/2}$ having a viscosity of 5-10,000 centistokes at 25° C., wherein the letter a has a value in the range $1.95 < a < 2.20$, and R is a monovalent organic group selected from saturated or unsaturated monovalent hydrocarbon groups with 1-30 carbon atoms, halogenated hydrocarbon groups, alkoxy groups, hydroxyl groups and hydrogen atoms.

7 Claims, No Drawings

COMPOSITION FOR PROTECTING NONPOROUS SURFACES FROM WATER

FIELD OF THE INVENTION

This invention relates to a surface treatment agent which can be used on glass surfaces, metal surface and the surfaces of ceramic moldings, and more particularly, concerns a water repellent which can be applied under simple treatment conditions.

BACKGROUND OF THE INVENTION

In many industrial fields, it is highly desirable to protect glass surface, metal surfaces and the surfaces of ceramic moldings from steam or rainwater, or from hydrophilic contaminants, in order to improve their durability, prevent corrosion and improve aesthetic appearance.

In particular, it is desirable to provide a water repellent treatment for automobile windshields which obviates the need to use wipers when driving at high speed, and a suitable material had therefore been long-awaited from the viewpoint of safe driving.

Many of the various water repellent agents already commercially available, however, require a thermal cure as an essential part of the treatment, and a curing catalyst had to be added when the agent was used. While these agents therefore do form a highly durable water repellent film, provided treatment conditions are ideal, they suffered from the drawback that they are very troublesome to use.

To resolve this problem, compositions containing alkylpolysiloxanes and acidic constituents as their active components are known as disclosed in Examined Japanese Patent Publication Nos. 50-15473 (U.S. Pat. No. 3,579,540) and 63-67828.

Although said compositions form a water repellent film which is relatively durable, it is necessary to add to them strong acids such as sulfuric acid, phosphoric acid, hydrochloric acid and fluorosulfonic acid. When they are applied to metal surfaces, therefore, they often create a corrosion problem, and even if the material being treated is not metal, there is a high risk of corroding adjacent metal parts.

As it was impossible to avoid the contact of said composition with workers' skin and clothing when coating them onto surfaces, an improvement was therefore desirable from the viewpoint of safety.

SUMMARY OF THE INVENTION

A first object of this invention is therefore to provide a water repellent composition which forms a highly water repellent film under simple treatment conditions.

A second object of this invention is to provide a water repellent which forms a highly water repellent composition film, and which is safe and easy to handle.

A third object of this invention is to provide a water repellent composition which easily forms a highly water repellent film without causing metal corrosion.

The above objects of this invention are achieved by a water repellent comprising 1-20 wt % of a silyl phosphate containing 1-10 wt % of phosphorus, and less than 20 wt % of an organopolysiloxane of general formula $R_aSiO_{(4-a)/2}$ having a viscosity of 5-10,000 centistokes at 25° C., the mixture being diluted with a volatile organic solvent.

As the water repellent composition of this invention does not use strong acids, they do not corrode metals. Moreover, as the solubility of the constituents of the repellent in solvents is extremely good, it is easily manufactured and can be made safe for workers. Further, as there is practically a free choice of solvents, it is extremely easy to manufacture a repellent which has no adverse effect on the surface to be treated, and so workability can be improved.

DETAILED DESCRIPTION OF THE INVENTION

The first constituent of the water repellent of the invention, viz the silyl phosphate, has the following structural formula given in Japanese Patent Koukoku No. 63-34877 (U.S. Pat. No. 4,125,551) and in the present invention, said silyl phosphate in particular contains 1-10 wt %, and more preferably 2-8 wt %, of phosphorus.

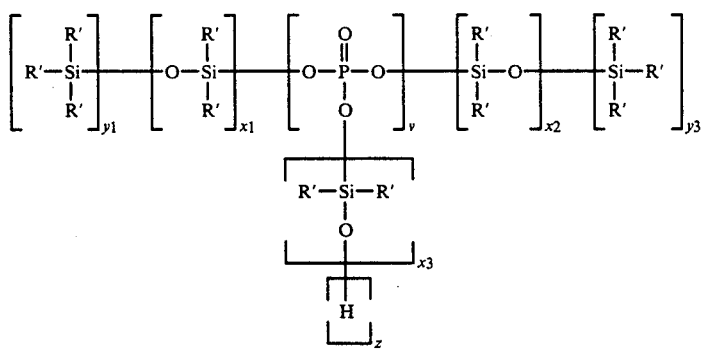

In this formula, v is the concentration of phosphate groups, $y_1+y_2$ is the concentration of terminal triorganosiloxy groups, $x_1+x_2+x_3$ is the concentration of diorganosiloxy groups, z is the concentration of hydroxyl groups connected to residual silicon or phosphorus atoms, and R' is a monovalent hydrocarbon group.

If the phosphorus content of the silyl phosphate is less than 1%, there is insufficient affinity between the composition of this invention and the surface of the material to be treated when the composition is coated on the surface, and a satisfactory prolonged water repellency cannot be obtained. The phosphorus content must therefore be adequate, but if it is greater than 10%, it is difficult to obtain a stable silyl phosphate.

The organopolysiloxane used as the second constituent may have a chain, branched or cyclic structure. In the general formula, $R_aSiO_{(4-a)/2}$, letter a has a value in the range $1.95 < a < 2.20$ and R is a monovalent organic group selected from among saturated or unsaturated monovalent hydrocarbon groups, halogenated hydrocarbon groups, alkoxy groups, hydroxyl and a hydrogen atom, R being identical or dissimilar. Specific examples of R are saturated aliphatic hydrocarbon groups such as methyl, ethyl, propyl, butyl, hexyl, heptyl, octyl decyl; saturated alicyclic hydrocarbon groups such as cyclopentyl and cyclohexyl; unsaturated hydrocarbon groups such as vinyl and allyl; aromatic hydrocarbon groups such as phenyl and tolyl; halogenated hydrocarbon groups such as chloromethyl, trifluoropropyl or chlorophenyl, that is, part of the hydrogen atoms of the before mentioned groups are substituted by halogen atoms; groups such as cyanoalkyl (e.g. cyanoethyl group) wherein part of the hydrogen atoms of the before mentioned groups are substituted by cyano groups; alkoxy groups such as methoxy, ethoxy, propoxy, hexanoxy and octanoxy; and R can also comprise a hydroxyl group or a hydrogen atom.

When there are more than one R groups they may be either all identical or different.

It is preferable that the number of carbon atoms in said saturated aliphatic hydrocarbon groups, alicyclic hydrocarbon groups, unsaturated hydrocarbon groups, aromatic hydrocarbon groups, halogenated hydrocarbon groups, cyanoalkyl groups and alkoxy groups, is 1-30. If the number of carbon atoms is greater than 30, the surface tension of the organopolysiloxane increases, and consequently, its wettability on the surface to be treated decreases so that it is difficult to form a uniform water repellent film thereon.

In this invention, of the above R groups, methyl, alkoxy groups, hydroxyl and a hydrogen atom are particularly preferable.

Further, the viscosity of said organopolysiloxane at 25° C. is 5–10,000 centistokes, and preferably 10–1,000 centistokes. If the viscosity is less than 5 centistokes, the volatility of the repellent film formed by the water repellent is too high, and a water repellent film with long-term durability is not obtained; on the other hand, if the viscosity is higher than 10,000 centistokes, the spreadability of the water repellent composition on the surface to be treated decreases, so that it is difficult to form a uniform water repellent film.

The silyl phosphate and organopolysiloxane used in this invention are dissolved in a volatile organic solvent to give a homogeneous solution. In this regard, if the blending proportion of silyl phosphate is less than 1 wt %, adequate water repellent properties are not obtained; on the other hand, if the blending proportions of silyl phosphate and organopolysiloxane are respectively greater than 20 wt %, a thick oil film remains after the organic solvent has vaporized, and has to be wiped off carefully to make the film uniform. This is not only troublesome, but also uneconomical.

The concentration of the silyl phosphate and the organopolysiloxane in the treatment solution may be conveniently adjusted, depending on the type of silyl phosphate and organopolysiloxane employed in order to obtain a water repellent film with good workability and high durability.

There is no particular restriction on the volatile organic solvent used provided it dissolves the silyl phosphate and organopolysiloxane. Examples are aliphatic alcohols, organopolysiloxanes, saturated aliphatic hydrocarbons, aromatic hydrocarbons and halogenated hydrocarbons with a boiling point of 70°–300° C. under one atmosphere pressure. The aliphatic alcohols, may be ethanol, n-propyl alcohol, isopropyl alcohol, n-butyl alcohol, isobutyl alcohol or sec-butyl alcohol.

Examples of organopolysiloxanes which may be used as solvent are cyclic polysiloxanes such as hexamethylcylco-trisiloxane, octamethylcyclo-tetrasiloxane, decamethylcyclopentasiloxane, dodecamethylcyclohexasiloxane, trimethyltriethyl-cyclotrisiloxane, hexaethylcyclotrisiloxane, diethyltetraethyl-cyclotrisiloxane, dimethyltetraethyl-cyclotrisiloxane, and tetraethyltetramethyl-cyclotetrasiloxane; straight chain polysiloxanes such as hexamethyldisiloxane, octamethyltrisiloxane, decamethyltetra-siloxane, dodecamethylpentasiloxane, tetradecamethyl-hexasiloxane, hexaethyldisiloxane, and octaethyl-trisiloxane; or branched polysiloxanes such as methyltris(trimethylsiloxy)silane and phenyltris(trimethylsiloxy)silane.

One of these organopolysiloxanes may be used alone, or a mixture of 2 or more of them may be used.

Examples of saturated aliphatic hydrocarbons which may be used as solvent are hexane, heptane, octane, decane, ligroin, mineral spirit, kerosene and isoparaffins; the aromatic hydrocarbons used as solvent are benzene, toluene or xylene; and are examples of the halogenated hydrocarbons used as solvent may for example be trichloroethane, trichloroethylene, tertrachloroethane or chlorofluorinated hydrocarbons.

In this invention, as described above, a very wide range of solvents may be used, and there is an effectively free choice of solvent in adjusting the water repellent of this invention. As the solubility of said silyl phosphate and organopolysiloxane in the organic solvent is extremely high, a homogeneous solution of the water repellent composition of this invention may easily be obtained just by stirring at room temperature after blending there constituents together.

The organopolysiloxane having a viscosity of 5–10,000 centistokes at 25° C., and represented by the general formula $R_aSiO_{(4-a)/2}$, is not an essential constituent of this invention, but in order to make the composition of the invention a more effective water repellent, it s in general preferable to use a quantity of organopolysiloxane equivalent to 0.25–2 times the quantity of silyl phosphate.

EXAMPLES

We shall now describe this invention in more detail with reference to specific examples, however the invention is not limited to these examples.

The viscosity of the water repellent in these examples is given at 25° C.

EXAMPLE 1

A silyl phosphate consisting of a methyl polysiloxane containing 4.6 wt % of phosphorus, was dissolved in hexamethyl disiloxane as solvent, and adjusted to give a 10 wt % solution of water repellent.

The treatment solution obtained was applied by a paper towel to give a thin uniform coat on the surface of a clean, hard glass plate (26 mm × 76 mm × 1.3 mm), and the plate left at room temperature for 5 min.

Using a clean, dry paper towel, the surface was wiped until no oil remained visible on it. Within 1 hour after this operation, the contact angle in the case of pure water (this will be referred to as contact angle before immersion), was measured using a Kyowa Kagaku K.K. Contact Angle Apparatus "CA-A" with a pure water drip of approx. 0.007 g at 25° C. The angle was found to be 87°.

The glass plate was then immersed in a bath of running tap water for 7 days, removed, and the contact angle in the case of pure water (this will be referred to as contact angle after immersion), was measured by exactly the same method as before immersion. The angle was found to be 82°.

Next, a solution of the water repellent was coated on a clean steel plate (25 mm×100 mm×0.3 mm) by the same method as was used with the above glass plate. This treated steel plate was left at 25° C. for 3 days in a desiccator in which the humidity had been adjusted to 81% with an ammonium choloride slurry. When the surface was inspected for rusting, it was found that there was some spot corrosion of part of the surface, but most of the surface retained its luster.

EXAMPLES 2-8 AND COMPARATIVE EXAMPLES 1-3

The contact angle in the case of pure water before and after immersion, was measured by exactly the same method as in Example 1, excepting that the organopolysiloxanes and solvents shown in Table 1 were used together with the silyl phosphate used in Example 1, and a steel plate corrosion test was carried out. As shown in Table 2, the results show that in all cases where the water repellent of this invention was used, good water repellent properties and retention of said properties were obtained, and there was practically no corrosion of the steel plate. On the other hand, in the case of Comparative Examples 1 and 2 containing concentrated sulfuric acid, there was considerable rusting of the whole surface of the steel plate, while in the case of Comparative Example 3, which did not contain sulfuric acid, there was a considerable decline in the water repellent properties.

TABLE 1

| | Blending Composition of Treatment solution | | | | |
|---|---|---|---|---|---|
| | Organopolysiloxane | | Blending Proportion of Silyl Phosphate (%) | Blending Proportion of Conc. Sulfuric Acid (%) | Solvent |
| No. | Type (viscosity) | Blending Proportion (%) | | | |
| 2 | trimethylsiloxy-terminated dimethylpolysiloxane (20 cs) | 5 | 5 | 0 | Isopropyl alcohol |
| 3 | trimethylsiloxy-terminated dimethylsiloxane. hydrogenmethylpolysiloxane copolymer (25 cs) | 5 | 4 | 0 | As above |
| 4 | trimethylsiloxy-terminated hydrogenmethylpolysiloxane (18 cs) | 5 | 3 | 0 | As above |
| 5 | trimethylsiloxy-terminated dimethylsiloxane. octylmethylsiloxane copolymer (34 cs) | 4 | 8 | 0 | Hexamethyl disiloxane |
| 6 | trimethylsiloxy-terminated dimethylpolysiloxane (105 cs) | 2 | 8 | 0 | As above |
| 7 | trimethylsiloxy-terminated hydrogenmethylpolysiloxane (18 cs) | 3 | 6 | 0 | Iospar-M |
| 8 | α, ω-dihydroxy-dimethylpolysiloxane (25 cs) | 5 | 5 | 0 | As above |
| Comparative Example | | | | | |
| 1 | trimethylsiloxy-terminated dimethylpolysiloxane (20 cs) | 10 | 0 | 1 | Isopropyl alcohol |
| 2 | α, ω-dihydroxy-dimethylpolysiloxane (25 cs) | 10 | 0 | 1 | As above |
| 3 | trimethylsiloxy-terminated dimethylpolysiloxane (20 cs) | 10 | 0 | 0 | As above |

Isopar-M: an isoparaffin manufactured by Exxson Chemical Co. K.K.

TABLE 2

| | Test Results | | |
|---|---|---|---|
| | Contact Angle for Pure Water (°) | | |
| No. | Before Immersion in Water | After Immersion in Water | Results of Steel Plate Corrosion Test |
| 2 | 88 | 86 | Some corrosion are observed, but most retains luster |
| 3 | 98 | 92 | Thin surface corrosion is observed on approx. 10% area, but the other area retains luster |
| 4 | 101 | 95 | Thin surface corrosion is observed on approx. 20% area, but the other area retains luster |
| 5 | 96 | 95 | Whole surface retains luster |
| 6 | 87 | 86 | As above |
| 7 | 102 | 96 | As above |

TABLE 2-continued

| | Test Results | | |
|---|---|---|---|
| | Contact Angle for Pure Water (°) | | |
| No. | Before Immersion in Water | After Immersion in Water | Results of Steel Plate Corrosion Test |
| 8 | 93 | 89 | As above |
| Comparative Example | | | |
| 1 | 98 | 91 | Red rust appears over whole surface |
| 2 | 103 | 102 | As above |
| 3 | 36 | 34 | Whole surface retains luster |

What is claimed:

1. A water repellent composition comprising a solution in a volatile organic solvent of 1-20 wt % of a silyl phosphate having a 1-10 wt % phosphorus content, and (b) less than 20 wt % of an organopolysiloxane having a viscosity of 5-10,000 centistokes at 25° C. and of the formula $R_aSiO_{(4-a)/2}$ wherein "a" has a value in the range $1.95<a<2.20$, and R is a saturated or unsaturated monovalent hydrocarbon group of 1-30 carbon atoms, a halogenated hydrocarbon group, an alkoxy group, an hydroxyl group or a hydrogen atom.

2. The water repellent composition of claim 1, wherein the phosphorus content of the silyl phosphate is 2-8 wt %.

3. The water repellent composition of claim 1, wherein R methyl, alkoxy groups, hydroxyl and a hydrogen atom.

4. The water repellent composition of claim 1, wherein the viscosity of the organopolysiloxane is 10-10,000 centistokes.

5. The water repellent composition of claim 1, wherein the volatile organic solvent comprises one with a boiling point of 70°-300° C. under one atmosphere pressure, selected from aliphatic alcohols, organopolysiloxanes, saturated hydrocarbons, aromatic hydrocarbons and halogenated hydrocarbons.

6. The water repellent composition of claim 1, wherein the amount of organopolysiloxane therein is 0.25-2 times that of the silyl phosphate.

7. The water repellent composition of claim 1, wherein the phosphorus content of the silyl phosphate is 2-8 wt %, wherein R is methyl, an alkoxy group, an hydroxy group or a hydrogen atom, wherein the viscosity of the organopolysiloxane is 10-10,000 centistokes, wherein the volatile organic solvent comprises one with a boiling point of 70-300° C. under one atmosphere pressure, selected from aliphatic alcohols, organopolysiloxanes, saturated hydrocarbons, aromatic hydrocarbons and halogenated hydrocarbons and wherein the amount of organopolysiloxane therein is 0.25-2 times that of the silyl phosphate.

* * * * *

UNITED STATES PATENT AND TRADEMARK OFFICE
CERTIFICATE OF CORRECTION

PATENT NO. : 5,021,089

DATED : June 4, 1991

INVENTOR(S) : KUWATA et al.

It is certified that error appears in the above-identified patent and that said Letters Patent is hereby corrected as shown below:

Col. 7, lines 30-31, claim 3, reads - - - -

Wherein R methyl, alkoxy groups, hydroxyl and hydrogen atom.

should read - - - -

Wherein R is Methyl, alkoxy group, hydroxyl or a hydrogen atom.

Col. 7, line 34, claim 4, reads ---

10-10,000 centistokes.

Should read - - - 10-1,000 centistokes.

Col. 8, line 25, claim 7, reads - - - - of the organopolysiloxane is 10-10,000 centistokes, should read - - - of the organopolysiloxane is 10-1,000 centistokes Signed and Sealed this Sixth Day of October, 1992

*Attest:*

DOUGLAS B. COMER

*Attesting Officer*      *Acting Commissioner of Patents and Trademarks*